US012573512B2

(12) United States Patent
Liu et al.

(10) Patent No.: US 12,573,512 B2
(45) Date of Patent: Mar. 10, 2026

(54) INTEGRATED PASSIVE REACTOR

(71) Applicant: Shanghai Nuclear Engineering Research & Design Institute Co., LTD., Shanghai (CN)

(72) Inventors: Zhan Liu, Shanghai (CN); Haitao Wang, Shanghai (CN); Guodong Wang, Shanghai (CN); Bo Yang, Shanghai (CN); Kemei Cao, Shanghai (CN)

(73) Assignee: Shanghai Nuclear Engineering Research & Design Institute Co., LTD., Shanghai (CN)

( * ) Notice: Subject to any disclaimer, the term of this patent is extended or adjusted under 35 U.S.C. 154(b) by 463 days.

(21) Appl. No.: 18/027,403

(22) PCT Filed: Mar. 17, 2022

(86) PCT No.: PCT/CN2022/081456

§ 371 (c)(1),
(2) Date: Mar. 21, 2023

(87) PCT Pub. No.: WO2022/194247

PCT Pub. Date: Sep. 22, 2022

(65) Prior Publication Data

US 2024/0029904 A1 Jan. 25, 2024

(30) Foreign Application Priority Data

Mar. 17, 2021 (CN) ......................... 202110304905.8

(51) Int. Cl.
*G21C 15/18* (2006.01)
*G21C 15/12* (2006.01)

(52) U.S. Cl.
CPC .......... *G21C 15/182* (2013.01); *G21C 15/12* (2013.01)

(58) Field of Classification Search
None
See application file for complete search history.

(56) References Cited

U.S. PATENT DOCUMENTS 4,554,129 A 11/1985 Peinado et al.
9,275,761 B2 * 3/2016 Cronje .................. G21C 15/18

(Continued)

FOREIGN PATENT DOCUMENTS

CA 2954136 A1 * 1/2016
CN 103295656 A 9/2013

(Continued)

OTHER PUBLICATIONS

Zhan, Liu, et al. "Small reactors engineered safety features (ESFs) and CAP200 passive ESF demonstration." The Proceedings of the International Conference on Nuclear Engineering (ICONE) 2019. 27. The Japan Society of Mechanical Engineers, 2019. (Year: 2019).*

(Continued)

*Primary Examiner* — Lily C Garner
(74) *Attorney, Agent, or Firm* — Renner, Otto, Boisselle & Sklar, LLP.

(57) ABSTRACT

Integrated passive reactor including a reactor primary circuit, a containment cooling system, a residual heat removal system, and a reactor core cooling system. Loop resistance is reduced by means of a reactor-type process design, a flow guide device is provided at a rising section of fluid to reduce the loop resistance, the rising section is shrunken to increase the arrangement space of a heat exchanger so as to further optimize system resistance, and the designs of an infinite-time passive reactor core residual heat removal system and an infinite-time passive containment cooling system are achieved. By means of the rational configuration of a pressure relief system, high-pressure safety injection is removed, and the passive reactor core cooling system is (Continued)

simplified. By means of the design of an auxiliary circulation device for a loss of coolant accident, the safety of a reactor core in the loss of coolant accident is further enhanced.

10 Claims, 1 Drawing Sheet

(56) References Cited

U.S. PATENT DOCUMENTS

| | | | | |
|---|---|---|---|---|
| 9,523,496 | B2 * | 12/2016 | Bingham | G21C 1/322 |
| 2016/0247585 | A1 | 8/2016 | Han et al. | |
| 2018/0350472 | A1 | 12/2018 | Fu | |

FOREIGN PATENT DOCUMENTS

| | | | | | |
|---|---|---|---|---|---|
| CN | 203931515 | U | | 11/2014 | |
| CN | 104361914 | A | | 2/2015 | |
| CN | 105719706 | A | * | 6/2016 | |
| CN | 105741888 | A | | 7/2016 | |
| CN | 106158056 | A | | 11/2016 | |
| CN | 108320822 | A | * | 7/2018 | F22B 1/00 |
| CN | 207909507 | U | * | 9/2018 | |
| CN | 108648837 | A | * | 10/2018 | G21C 15/02 |
| CN | 110265157 | A | * | 9/2019 | G21D 5/02 |
| CN | 110265158 | A | * | 9/2019 | G21C 15/12 |
| CN | 112885490 | A | | 6/2021 | |
| CN | 215450910 | U | | 1/2022 | |
| KR | 20140126187 | A | | 10/2014 | |
| KR | 101624561 | B1 | * | 5/2016 | G21C 9/00 |

OTHER PUBLICATIONS

Chinese Office Action for corresponding Application No. 202110304905.8, issued Mar. 1, 2024, with English translation.
International Search Report for the corresponding Application No. PCT/CN2022/081456, mailed on May 27, 2022 with an English translation.

* cited by examiner

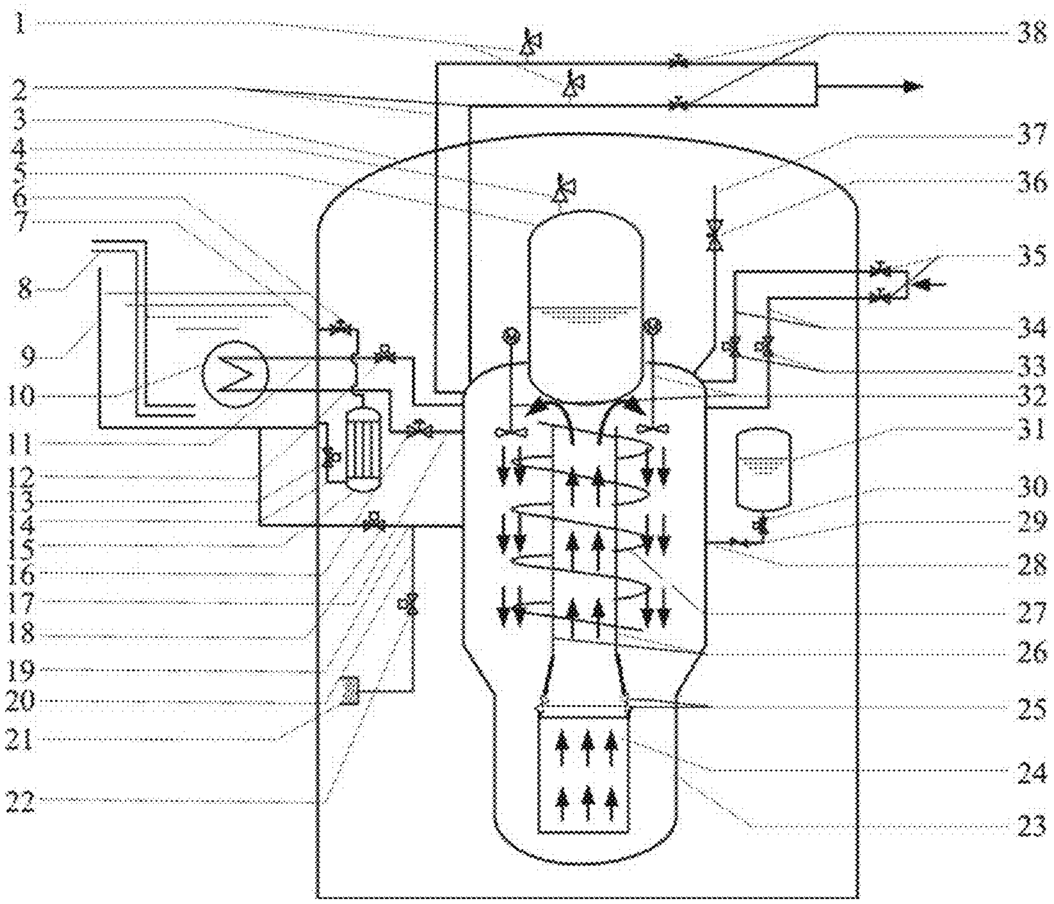
1
2
3
4
5
6
7
8
9
10
11
12
13
14
15
16
17
18
19
20
21
22
23
24
25
26
27
28
29
30
31
32
33
34
35
36
37
38

INTEGRATED PASSIVE REACTOR

CROSS-REFERENCE TO RELATED APPLICATIONS

This application is a national phase of International Application No. PCT/CN2022/081456 filed Mar. 17, 2022, which claims the priority of the Chinese Patent Application No. 202110304905.8, filed on Mar. 17, 2021, the entire content of which are hereby incorporated herein by reference.

TECHNICAL FIELD

The present application relates to the technical field of reactors, and in particular to an integrated passive reactor.

BACKGROUND

Generally, an integrated small-scale reactor with electric power of less than 300 MW is designed to include a core, a pressure regulator, heat exchangers and related piping valve components in a pressure vessel, which has the advantages of high safety, good economy and application flexibility.

In terms of safety, the integrated small-scale reactor is designed to include all devices in the pressure vessel, which prevents occurrence of loss of coolant accidents due to a large/medium-sized break in the reactor loop in design, and reduces probability of serious accidents and probability of core melting. At the same time, the integrated reactor is designed to shorten a flow path of the first loop and reduce the flow resistance, so it has a strong natural circulation capability and improves the inherent safety of the reactor.

In terms of economy, the integrated reactor reduces the construction materials of loop pipelines, and at the same time reduces the cost of some redundant safety facilities in the reactor, thereby greatly reducing the construction and assembly time of the reactor and saving a lot of labor costs. In addition, due to its small size and convenience on movement, the integrated small-scale reactor can be used not only for nuclear power generation, but also for urban district heating, seawater desalination, seabed exploration, industrial steam and hydrogen production, mobile nuclear power and other thermal energy utilization, and the like.

Since a conventional nuclear power plant adopts an active special system configuration to alleviate an accident, this type of active system relies heavily on the external power and power supply. Once the external power is unavailable, the residual heat of the core cannot be continuously taken out. If there are no back-up measures, the power plant would eventually face a serious accident, and a large amount of radioactive release hazards would even be caused.

In addition, for the main equipment and special system configuration in a large-scale passive pressurized water reactor (PWR) power plant, it usually has the following characteristics: an inner displacement water tank is arranged in the containment, causing the containment to be larger in size, and increasing burden on containment environment conditions; and a passive core cooling system is relatively complex, requiring high, medium and low pressure safety-injections, which may not effectively achieve infinite-time cooling of the reactor core or the containment.

SUMMARY

In order to solve the above-mentioned problems, the present application adopts the concept of integrated reactor-type design and passive safety, and reduces the loop resistance through a reactor-type process design. The present application proposes an integral passive safety system design to simplify the safety system configuration scheme, cancels the safety-level AC power source to simplify the design of support systems, and achieves infinite-time cooling of the reactor and the containment. In the present application, no operator intervention is required during an accident, thereby improving the safety and economy of the power plant.

The present application provides an integrated passive reactor which includes a reactor main loop, a containment cooling system, a residual heat removal system, and a core cooling system, wherein the reactor main loop includes a pressure vessel arranged in a containment, and a core, a pressure regulator, a diversion device and a steam generator arranged in the pressure vessel, wherein the diversion device is configured in a cylindrical structure arranged above the core and has a lower end close to the core and an upper end away from the core, the diameter of the lower end being larger than the diameter of the upper end, the steam generator is configured in a coil structure wound on the outside of the diversion device and has one end connected with a water supply pipeline and the other end connected with a main steam pipeline, and the pressure regulator is arranged at the top of the pressure vessel and is located above the diversion device; the containment cooling system is configured for exchanging heat inside and outside the containment so as to reduce the temperature and pressure in the containment; the residual heat removal system is configured for cooling a fluid in the steam generator when the water supply pipeline and the main steam pipeline are closed; and the core cooling system includes a pressure relief pipeline arranged at the top of the pressure vessel, a pressure accumulating safety-injection tank connected with the pressure vessel, and an auxiliary circulation device, wherein the pressure relief pipeline is able to reduce the internal pressure of the pressure vessel, the pressure accumulating safety-injection tank is configured for continuously injecting cooling water into the core when the pressure in the pressure vessel is reduced to a predetermined value, and the auxiliary circulation device is arranged between the diversion device and the core and is configured for making a fluid in the pressure vessel flow between the core and the pressure vessel so as to form a circulating flow channel when a level of the fluid in the pressure vessel is lowered to a predetermined value.

Preferably, a plurality of main pumps are arranged on the top of the pressure vessel and are configured to drive a reactor coolant fluid to exchange heat with the steam generator. The main pumps are located above the steam generator.

Preferably, the containment cooling system includes a heat exchanger arranged in the containment, a cooling water tank arranged outside the containment, and an air cooling guiding device arranged in the cooling water tank, wherein a guiding end of the air cooling guiding device extends out of the cooling water tank, the heat exchanger is connected with the cooling water tank to transfer the heat in the containment to the cooling water tank.

Preferably, the residual heat removal system includes a heat exchanging device arranged in a cooling water tank, wherein the heat exchanging device is connected to the steam generator and is configured to cool a fluid in the steam generator when the water supply pipeline and the main steam pipeline are closed.

Preferably, the core cooling system further includes a cooling water tank, a gravity injection pipeline and a pit recirculation pipeline, wherein the gravity injection pipeline is connected to the bottom of the cooling water tank and to the pressure vessel, and the pit recirculation pipeline has one end connected to the gravity injection pipeline and the other end connected to a pit filter located in the containment.

Preferably, the containment cooling system, the residual heat removal system and the core cooling system share the same cooling water tank.

Preferably, the steam generator is configured with a plurality of small coils spiraling around their own axis and/or a plurality of large coils spiraling around the central axis of the pressure vessel.

Preferably, the auxiliary circulation device is configured as a signal-driven valve, a differential-pressure-driven valve, a differential-pressure-driven baffle, a signal-driven lock baffle, a spring lock one-way flow device or a spring float one-way flow device.

Preferably, an upper end of the heat exchanger is connected with a heat exchanger outlet pipeline, the heat exchanger outlet pipeline being connected to an upper part of the cooling water tank and being provided with a heat exchanger outlet pipeline isolation valve, and a lower end of the heat exchanger is connected with a heat exchanger inlet pipeline, the heat exchanger inlet pipeline being connected to a lower part of the cooling water tank, the heat exchanging device is connected to the steam generator through a heat exchanging device inlet pipeline and a heat exchanging device outlet pipeline, the heat exchanging device outlet pipeline being provided with a heat exchanging device outlet pipeline isolation valve, and the heat exchanger outlet pipeline isolation valve and the heat exchanging device outlet pipeline isolation valve are normally closed steam-operated valves, the steam-operated valves being automatically opened when a safety level fails.

Preferably, the pressure relief pipeline is provided with a pressure relief valve, the pit recirculation pipeline is provided with a recirculation valve, and the pressure relief valve and the recirculation valve are configured as safety level DC-driven burst valves.

For the integrated passive reactor of the present application, a reactor-type process design is adopted to reduce the loop resistance; a diversion device is provided in a fluid rising section to reduce the loop resistance; through shrinking the rising section, the heat exchanger arrangement space is increased, so as to further optimize the system resistance, and designs of a passive core residual heat removal system for infinite time and a passive containment cooling system for infinite time are realized. Through properly configuring the pressure relief system and cancelling the high-pressure safety-injection, the passive core cooling system is simplified. Through a design of providing an auxiliary circulation device for loss of coolant accident, the safety of the core in the loss of coolant accident is further enhanced. The integrated passive reactor provided by the present application simplifies the configuration of the safety system, cancels the safety-level AC power supply, realizes the infinite-time cooling of the reactor and the containment, and the integrated passive reactor does not require intervention from an operator during an accident, thereby improving the safety and economy of the power plant.

It should be understood that the foregoing general description and the following detailed description are exemplary only and do not limit the application.

BRIEF DESCRIPTION OF THE DRAWINGS

In order to illustrate the technical solutions of the embodiments of the present application more clearly, the accompanying drawings required in the embodiments of the present application will be briefly described below. Obviously, the accompanying drawings described below are only specific embodiments of the present application, those skilled in the art can obtain other embodiments according to the following drawings without paying creative labor.

FIG. 1 is a schematic diagram of the configuration of an integrated passive reactor according to a specific embodiment of the present application.

REFERENCE NUMBERS

1—Steam generator safety valve; 2—Main steam pipeline; 3—Containment; 4—Pressure regulator safety valve; 5—Pressure regulator; 6—Heat exchanger outlet pipeline isolation valve; 7—Heat exchange outlet pipeline; 8—Air cooling guiding device; 9—Cooling water tank; 10—Heat exchanging device; 11—Heat exchanging device inlet pipeline; 12—Heat exchanging device inlet pipeline isolation valve; 13—Heat exchanger inlet pipeline isolation valve; 14—Heat exchanger inlet pipeline; 15—Heat exchanger, 16—Heat exchanging device outlet pipeline isolation valve; 17—Heat exchanging device outlet pipeline; 18—Gravity injection pipeline outlet isolation valve; 19—Gravity injection pipeline; 20—Pit recirculation pipeline; 21—Pit filter; 22—Pit recirculation isolation valve; 23—Pressure vessel; 24—Core; 25—Auxiliary circulation device; 26—Diversion device; 27—Steam generator; 28—Pressure accumulating safety-injection tank injection pipeline; 29—Pressure accumulating safety-injection tank injection pipeline check valve; 30—Pressure accumulating safety-injection tank injection pipeline isolation valve; 31—Pressure accumulating safety-injection tank; 32—Main pump; 33—Water supply pipeline regulating valve; 34—Water supply pipeline; 35—Water supply pipeline isolation valve; 36—Safety level pressure relief valve; 37—Pressure relief pipeline; 38—Main steam isolation valve.

The accompanying drawings, which are incorporated in and constitute a part of this specification, illustrate embodiments in accordance with the present application and together with the description serve to explain the principles of the present application.

DETAILED DESCRIPTION

In order to better understand the technical solutions of the present application, the embodiments of the present application are described in detail below in conjunction with the accompanying drawings.

It should be clear that the described embodiments arm only a part of the embodiments of the present application, rather than all the embodiments. Based on the embodiments in the present application, all other embodiments obtained by those of ordinary skill in the art without creative work fall within the protection scope of the present application.

The terms used in the embodiments of the present application are only for the purpose of describing specific embodiments, and are not intended to limit the present application. As used in the embodiments of this application and the appended claims, the singular forms “a”, “an”, “the” and “this” are intended to include the plural forms as well, unless the context clearly dictates otherwise.

It should be understood that the term “and/or” used herein is only an association relationship for describing associated objects, indicating that there may be three kinds of relationships, for example, A and/or B, which may indicate three cases as: A exists alone, there are A and B at the same time, and B exists alone. In addition, the character "/" in this text generally indicates that the related objects before and after "I" are of an "or" relationship.

It should be noted that the orientation words such as "upper", "lower", "left", "right" and the like described in the embodiments of the present application are described in the orientations shown in the accompanying drawings, and should not be interpreted as limitations to the embodiments of the present application. In addition, in this context, it should also be understood that when an element is referred to as being "on" or "under" another element, it can not only be directly connected "on" or "under" the other element, but also indirectly connected "on" or "under" another element through intervening elements.

After the Fukushima accident, passive technology has received more and more attention with its safety, reliability and economy. This technology does not rely on external inputs such as force, power or signal, manual operation, and the like, the effects of which depend on natural physical laws such as gravity, natural convection, heat conduction, etc., inherent characteristics such as material properties, or energy within a system such as chemical reactions, decay heat, etc. The application of a passive system makes the system to be in a safe state even when the system failed, which improves the safety of the system, and reduces the probability of core melting by 1 to 2 orders of magnitude.

The present invention proposes a design concept of an integrated passive reactor, which fully overcomes the deficiencies existing in the current passive PWR power plant through a proper design of the main equipment and special safety system.

FIG. 1 is a schematic diagram of the configuration of an integrated passive reactor according to a specific embodiment of the application.

As shown in FIG. 1, the integrated passive reactor of the present application includes a reactor main loop, a containment cooling system, a residual heat removal system and a core cooling system.

The reactor main loop includes a pressure vessel 23 arranged in a containment 3, a core 24, and a pressure regulator 5, a diversion device 26 and a steam generator 27 arranged in the pressure vessel 23. The diversion device 26 is configured in a cylindrical structure arranged above the core 24 and has a lower end close to the core 24 and an upper end away from the core 24, the diameter of the lower end being larger than the diameter of the upper end. The steam generator 27 is configured in a coil structure wound on the outside of the diversion device 26 and has one end connected with a water supply pipeline 34 and the other end connected with a main steam pipelines 2. The pressure regulator 5 is arranged at the top of the pressure vessel 23 and is located above the diversion device 26.

The water supply pipelines 34 are provided with water supply pipeline regulating valves 33 and water supply pipeline isolating valves 35, the water supply pipeline regulating valves 33 are located inside the containment 3, and the water supply pipeline isolating valves 35 are located outside the containment 3. The main steam pipelines 2 is provided with a steam generator safety valves 1 and a main steam isolation valves 38, and the steam generator safety valves 1 and the main steam isolation valves 38 are located outside the containment 3.

In the reactor main loop, the pressure vessel 23 is filled with a reactor coolant fluid. After the core 24 is heated, the reactor coolant fluid cools the core 24 and transfers the heat of the core 24 to the steam generator 27. The fluid in the steam generator 27 is transported by the water supply pipelines 34. After the reactor coolant fluid transfers the heat to the fluid in the steam generator 27, the fluid undergoes the transition from a single-phase liquid state to a single-phase steam state, and becomes overheated steam, then the overheated steam passes through the main steam pipelines 2 to external steam facilities, such as steam turbines.

The pressure vessel 23 can be divided into an upper chamber and a lower chamber, the core 24 is located in the lower chamber, and the diversion device 26, the steam generator 27, etc. are located in the upper chamber. In FIG. 1, the direction of the arrow indicates the flow direction of the reactor coolant fluid. After being heated by the core 24, the reactor coolant fluid in the core 24 flows upward and flows out through the upper end of the diversion device 26 away from the core 24, then flows through the steam generator 27, thereby transferring the heat of the core 24 to the steam generator 27. The reactor coolant fluid is cooled after heat exchange with the steam generator 27, and descends back to the lower chamber to enter the core 24 again, thereby forming a circulating flow of the reactor main loop.

The pressure regulator 5 is mainly designed for relieving the overpressure of the reactor main loop system, and the top of the pressure regulator 5 is provided with a pressure regulator safety valve 4. When the pressure of the reactor main loop system in the pressure vessel 23 exceeds a predetermined value, the pressure regulator 5 regulates the pressure in the pressure vessel 23 to ensure the safety of the pressure vessel 23.

The containment cooling system is configured for exchanging heat inside and outside the containment 3 so as to reduce the temperature and pressure in the containment 3. The design of the containment cooling system can realize the connection between water cooling and air cooling, so as to ensure the infinite-time export of residual heat in an accident.

The residual heat removal system is configured for cooling the fluid in the steam generator 27 when the water supply pipelines 34 and the main steam pipelines 2 are closed. A passive residual heat removal system is mainly configured to alleviate a non-loss of coolant accident (non-LOCA), and at the same time is configured to alleviate a loss of coolant accident (LOCA) after the LOCA occurs and before a liquid level of the reactor coolant fluid in the pressure vessel 23 is lowered below the upper end of the diversion device 26 away from the core 24 in the upper chamber.

The core cooling system is mainly configured to alleviate LOCA accidents. The core cooling system includes a pressure relief pipeline 37 arranged at the top of the pressure vessel 23, a pressure accumulating safety-injection tank 31 connected with the pressure vessel 23, and an auxiliary circulation device 25. The pressure relief pipeline 37 is provided with a safety level pressure relief valve 36 and is able to reduce the internal pressure of the pressure vessel 23. The pressure accumulating safety-injection tank 31 is configured for continuously injecting cooling water into the core 24 when the pressure in the pressure vessel 23 is reduced to a predetermined value. The auxiliary circulation device 25 is arranged between the diversion device 26 and the core 24 and is configured for making a fluid in the pressure vessel 23 to flow between the core 24 and the pressure vessel 23 to form a circulating flow channel when a level of the fluid in the pressure vessel 23 is lowered to a predetermined value.

The pressure accumulating safety-injection tank 31 is arranged between the pressure vessel 23 and the containment 3, and is connected to the pressure vessel 23 through a pressure accumulating safety-injection tank injection pipeline 28, and the pressure accumulating safety-injection tank injection pipeline 28 is provided with a pressure accumulating safety-injection line check valve 29 and a pressure accumulating safety-injection tank injection pipeline isolation valve 30.

According to the features of the LOCA accident, the core cooling system acts in concert with the passive residual heat removal system to mitigate the accident process. After the LOCA accident, before a liquid level of the reactor coolant fluid drops below the upper end of the diversion device 26 away from the core 24 in the upper chamber of the pressure vessel 23, the passive residual heat removal system is activated to remove the residual heat from the core 24. When the liquid level is further lowered below the upper end of the diversion device 26 away from the core 24 in the upper chamber, the safety level pressure relief valve 36 of the pressure relief pipeline 37 is opened to relieve the pressure of the system, so that the system pressure is reduced to a pressure at which the pressure accumulating safety-injection tank 31 is put into operation. After the pressure accumulating safety-injection tank 31 is put into operation, cooling water is continuously injected into the core 24. This process is a charging and discharging cooling process of the pressure accumulating safety-injection tank 31. In this process, since the liquid level of the reactor coolant fluid of the pressure vessel 23 has lowered below the upper end of the diversion device 26 away from the core 24 in the upper chamber, the auxiliary circulation device 25 communicating with the outlet of the core 24 will be opened, so as to establish a natural circulation flow channel for the fluid between the core 24 and the diversion device 26, thereby ensuring the continuous cooling of the core 24. In this way, the putting into operation of the pressure accumulating safety-injection tank 31 ensures that the core 24 can be effectively submerged under the liquid level.

In some embodiments, the bottom of the containment 3 is provided with a pit (not shown) for the recovery of the reactor coolant fluid from the reactor main loop, so as to achieve the long-term pit recirculation cooling of the reactor core 24. A pit filter 21 is provided in the pit and can filter the debris generated after an accident.

As shown in FIG. 1, the core cooling system further includes a cooling water tank 9, a gravity injection pipeline 19 and a pit recirculation pipeline 20. The gravity injection pipeline 19 is connected with the bottom of the cooling water tank 9 and the pressure vessel 23, and the pit recirculation pipeline 20 has one end connected to the gravity injection pipeline 19 and the other end connected to the pit filter 21 located in the containment 3.

The gravity injection pipeline 19 is provided with a gravity injection pipeline outlet isolation valve 18 which is disposed at a part of the gravity injection pipeline 19 located between the containment 3 and the pressure vessel 23. The pit recirculation pipeline 20 is connected to a part of the gravity injection pipeline 19 located between the gravity injection pipeline outlet isolation valve 18 and the pressure vessel 23, and the pit recirculation pipeline 20 is provided with a pit recirculation isolation valve 22.

In a later stage of an accident, the system pressure is further reduced, the gravity injection pipeline outlet isolation valve 18 is opened, and cooling water is continuously injected to the core 24; in a case that the liquid level of the fluid in the pressure vessel 23 continues to drop while the liquid level of the fluid in the pit in the containment 3 continues to rise, when a water level in the cooling water tank 9 is close to emptying, the pit recirculation isolation valve 22 is opened to ensure that the fluid in the pit is injected into the pressure vessel 23 to achieve infinite-time charging and discharging cooling, so that the high pressure safety-injection can be eliminated from the core cooling system.

In the integrated passive reactor of the present application, an integrated design scheme is adopted, in which the pressure regulator 5 and the steam generator 27 are provided inside the pressure vessel 23, this integrated design scheme cancels the design of a main pipeline, and eliminates the possibility of the occurrence of a large-sized break. The diversion device 26 reduces the loop resistance; the diameter of a side of the diversion device 26 close to the core 24 is larger than the diameter of a side of the diversion device 26 away from the core 24, that is, the diameter of the lower end of the diversion device 26 is larger than the diameter of the upper end of the diversion device 26, thereby forming a cylindrical structure with a bell mouth shape at the bottom. Through shrinking the upper end of the diversion device 26, the arrangement space of the heat exchanger 15 is improved, and the system resistance is further optimized. Moreover, the present application simplifies the configuration of the safety system, cancels the safety-level AC power source, simplifies the design of the support system, and realizes the infinite-time cooling of the core 24 and the containment 3. In the present application, no operator intervention is required during an accident, thereby improving the safety and economy of the power plant.

In some embodiments, for a small reactor with a lower power level, the main pump 32 is not provided in the pressure vessel 23, and the heat output of the reactor main loop can be achieved by adopting natural circulation.

In other embodiments, the top of the pressure vessel 23 is provided with a plurality of main pumps 32. The main pumps 32 are located above the steam generator 27 and are configured to drive the reactor coolant fluid to exchange heat with the steam generator 27. After being heated by the core 24, the reactor coolant fluid flows to the inlet of the main pump 32 through the upper chamber, and the reactor coolant fluid is driven by the main pump 32 to flow laterally through the steam generator 27, thereby transferring the heat of the reactor main loop to a fluid in the steam generator 27. The cooled reactor coolant fluid descends and then enters the core 24 again, so as to complete the circulating flow of the reactor main loop.

In some specific embodiments, the containment cooling system includes a heat exchanger 15 provided in the containment 3, a cooling water tank 9 provided outside the containment 3 and an air-cooled guiding device 8 provided in the cooling water tank 9. The guiding end of the air-cooled guiding device 8 extends out of the cooling water tank 9, and the heat exchanger 15 is connected to the cooling water tank 9 to transfer the heat in the containment 3 to the cooling water tank 9. The air-cooled guiding device 8 establishes a flow channel for the external cold air to enter the cooling water tank 9, and realizes the communication between the hot air in the cooling water tank 9 and the external cold air. When the water level of the cooling water tank 9 is lowered, for example, when it falls below the height of the heat exchanger 15, the air-cooling guiding device 8 can lead the cold air from the external environment to the wall surface of the containment 3. The density difference between the cold air and hot air will drive the fluid to overcome the resistance to form a natural circulation flow and to exchange heat. After being heated by the wall surface of the containment 3, the cold air becomes hot air with an elevated temperature and flows upward, thereby cooling the containment 3, reducing the pressure and temperature in the containment 3, and realizing the purpose of infinite-time cooling of the containment 3. On the other hand, the air-cooling guiding device 8 can lead the cold air from the environment to the vicinity of the heat exchanger 15, and the resulted hot air by heating of the heat exchanger 15 flows upward to form infinite-time natural air circulation to cool the heat exchanger 15.

The upper end of the heat exchanger 15 is connected with a heat exchanger outlet pipeline 7 which is in turn connected to the upper part of the cooling water tank 9, and the heat exchanger outlet pipeline 7 is provided with a heat exchanger outlet pipeline isolation valve 6. The lower end of the heat exchanger 15 is connected with a heat exchanger inlet pipeline 14 which is in turn connected to the lower part of the cooling water tank 9. The heat exchanger inlet pipeline 14 is provided with a heat exchanger inlet pipeline isolation valve 13. The heat exchanger outlet pipeline isolation valve 6 is configured as a normally closed steam-operated valve, which is automatically opened when the safety level fails.

The design of the containment cooling system can realize the connection between water cooling and air cooling to ensure that the residual heat is exported in infinite time after an accident. After the system is triggered, the heat exchanger outlet pipeline isolation valve 6 and the heat exchanger inlet pipeline isolation valve 13 in the containment 3 are automatically opened. Driven by a natural circulation driving force, the hot fluid in the heat exchanger 15 passes through the heat exchanger outlet pipeline 7 in the containment 3 and flows into the cooling water tank 9 outside the containment 3, so that the heat in the containment 3 is transferred to the cooling water tank 9 outside the containment 3; the cooling water in the cooling water tank 9 flows back to the heat exchanger 15 in the containment 3 again through the heat exchanger inlet pipeline 14 in the containment 3. Since the water in the cooling water tank 9 is continuously heated (the heat in the containment 3 and the heat transferred by the possible passive residual heat removal system), when the water in the cooling water tank 9 is heated to boiling, the liquid level of the water tank gradually drops until it is empty. After the water level of the cooling water tank 9 is emptied, the air-cooling guiding device 8 can lead the cold air from the environment to the wall surface of the containment 3 and the resulted hot air by heating of the wall surface of the heat exchanger 15 flows upward to cool the containment 3 and remove the heat in the containment 3, thereby reducing the pressure and temperature in the containment 3, realizing the cooling on the heat exchanger 15 by the air-cooled guiding device 8, and realizing the purpose of infinite-time cooling of the containment.

In some embodiments, the residual heat removal system includes a heat exchanging device 10 disposed in the cooling water tank 9. The heat exchanging device 10 is connected to the steam generator 27, and cools the fluid within the steam generator 27 when the water supply pipelines 34 and the main steam pipelines 2 are closed.

The heat exchanging device 10 is connected to the steam generator 27 through a heat exchanging device inlet pipeline 11 and a heat exchanging device outlet pipeline 17. The heat exchanging device outlet pipeline 17 is provided with a heat exchanging device outlet pipeline isolation valve 16, and the heat exchanging device inlet pipeline 11 is provided with a heat exchanging device inlet pipeline isolation valve 12. The heat exchanging device outlet pipeline isolation valve 16 is configured as a normally closed steam-operated valve, and the steam-operated valve is automatically opened when a safety level fails.

After the residual heat removal system is triggered, the heat exchanging device outlet pipeline isolation valve 16 on the heat exchanging device outlet pipeline 17 is automatically opened, while the water supply pipeline isolation valves 35 on the water supply pipelines 34 and the main steam isolation valves 38 on the main steam pipelines 2 are closed, thereby establishing a complete residual heat removal system fluid channel. The steam generated in the steam generator 27 enters the passive residual heat removal heat exchanging device 10 through the heat exchanging device inlet pipeline 11 of the passive residual heat removal system for cooling, and the cooled fluid flows through the heat exchanging device outlet pipeline 17 of the passive residual heat removal system, then flows into the water supply pipelines 34 and finally flows back into coils of the steam generator 27, thereby forming a complete natural circulation flow.

The passive residual heat removal heat exchanging device 10 transfers heat to the cooling water tank 9 outside the containment through heat conduction and convection heat exchange, and continuously heats the water in the cooling water tank 9. When the water in the cooling water tank 9 is heated to boiling, the liquid level of the water tank gradually decreases until it is emptied. Subsequently, the heat exchanger 15 will be cooled by introducing the air cooling guiding device 8 through the air channel in the containment 3 to realize the infinite-time bring-out of residual heat.

In some specific embodiments, the containment cooling system, the residual heat removal system and the core cooling system share the same cooling water tank 9, so that special safety facilities can be reasonably configured, and the economy and safety of the power plant can be improved.

In some specific embodiments, the steam generator 27 is configured as a plurality of small coils spiraling around their own axis and/or a plurality of large coils spiraling around the central axis of the pressure vessel 23. By reasonably configuring the number of coils and the way of spiraling, the heat exchange capacity of the steam generator 27 can be fully exerted, and the efficiency can be improved.

In some embodiments, the auxiliary circulation device 25 is configured as a signal-driven valve, a differential-pressure-driven valve, a differential-pressure-driven baffle, a signal-driven lock baffle, a spring lock one-way flow device or a spring float one-way flow device.

In order to enhance the safety of the core for the loss of coolant accident, the auxiliary circulation device 25 for the loss of coolant accident is provided to realize the natural circulation, and the residual heat export of the core 24 in a case of low water level of the pressure vessel 23, reduce the accumulation of the reactor heat, and avoid the generation of localized high temperatures in the core 24.

The auxiliary circulation device 25 communicating with the outlet of the core 24 can be designed as a valve, and can also be designed as a baffle, a spring locking device, or a combination thereof.

In some specific embodiments, the pressure relief pipeline 37 is provided with a safety level pressure relief valve 36, and the pit recirculation pipeline 20 is provided with a recirculation valve 22. The safety level pressure relief valve 36 and the recirculation valve 22 are configured as safety level DC-driven burst valves. The safety-level DC-driven burst valve eliminates the dependence on the safety-level AC power source and greatly reduces the requirement on the safety-level power supply.

The workflow of the integrated passive reactor in some embodiments is as follows.

During normal operation of the power plant, the water supply pipelines 34 continuously delivers fluid to the steam generator 27 (for generating steam to be delivered to an external steam facility). After being heated by the core 24, the reactor coolant fluid flows from the lower chamber of the pressure vessel 23 into the top of the upper chamber through the upper chamber, then the fluid passes through the diversion device 26 and flows down through the steam generator 27 for transferring the heat from the core 24 to the fluid in coils of the steam generator 27, and the cooled reactor coolant fluid descends and enters the core 24 again, so as to complete the circulating flow of the main loop. After being heated by the reactor coolant fluid, the fluid of the steam generator 27 undergoes the transition from a single-phase liquid state to a single-phase steam state, and becomes overheated steam, and then the overheated steam passes through the main steam pipeline 2 to external steam facilities.

Upon a non-LOCA accident, the residual heat removal system is triggered: the heat exchanging device outlet pipeline isolation valve 16 on the heat exchanging device outlet pipeline 17 and the heat exchanging device inlet pipeline isolation valve 12 on the heat exchanging device inlet pipeline 11 are automatically opened, while the water supply pipeline isolation valves 35 and the main steam isolation valves 38 are closed, thereby establishing a complete residual heat removal system fluid channel. The steam generated in the steam generator 27 enters the heat exchanging device 10 through the heat exchanging device inlet pipeline 11 for cooling, and the cooled fluid flows through the heat exchanging device outlet pipeline 17 into the water supply pipeline 34, and finally flows back into the coils of the steam generator 27, thereby forming a complete natural circulation flow. The heat exchanging device 10 transfers heat to the cooling water tank 9 outside the containment through heat conduction and convection heat exchange, and continuously heats the water in the water tank. When the water in the water tank is heated to boiling, the liquid level in the water tank gradually drops until it is emptied. The ambient cold air is diverted to the heat exchanging device 10 through the air-cooled guiding device 8 for cooling, so as to realize the infinite-time removal of the residual heat of the reactor.

In a short-term after the LOCA accident occurs, before the liquid level of the fluid in the pressure vessel 23 drops to the top of the diversion device 26 in the upper chamber, the residual heat of the core 24 can be removed by the passive residual heat removal system; when the liquid level is further reduced below the top of the diversion device 26 in the upper chamber, the safety level pressure relief valve 36 is opened to relieve the pressure of the system, so as to reduce the system pressure to the pressure at which the pressure accumulating safety-injection tank 31 is put into operation. After the pressure accumulating safety-injection tank 31 is put into operation, cooling water is continuously injected into the core 24. This process is a charging and discharging cooling process of the pressure accumulating safety-injection tank 31. In this process, since the liquid level of the fluid in the pressure vessel 23 has dropped below the top of the diversion device 26 in the upper chamber, the auxiliary circulation device 25 communicating with the outlet of the core 24 will be opened, so as to establish a natural circulation flow channel for the fluid between the core 24 and a descending section, thereby ensuring the continuous cooling of the core 24, reducing the accumulation of heat in the reactor and avoiding the generation of localized high temperatures in the core 24. In this way, the putting into operation of the pressure accumulating safety-injection tank 31 can effectively ensure that the core 24 is submerged under the liquid level.

In a later stage of the LOCA accident, the system pressure is further reduced, the gravity injection pipeline outlet isolation valve 18 is opened, and cooling water is continuously injected to the core 24; in a case that the liquid level of the fluid in the pressure vessel 23 continues to drop while the water level in the pit in the containment 3 continues to rise, when a water level in the cooling water tank 9 reaches a low lever, the pit recirculation isolation valve 22 is opened to ensure that the water in the pit is injected into the pressure vessel 23 to achieve long-term charging and discharging cooling.

Upon the occurrence of the release of the mass energy inside the containment 3 (i.e., accidents such as LOCA or the break of the main steam pipelines 2), the passive containment cooling system for infinite-time can be put into operation when driven by signals such as the pressure or temperature of the containment 3. The heat exchanger inlet pipeline isolation valve 13 on the heat exchanger inlet pipeline 14 and the heat exchanger outlet pipeline isolation valve 6 on the heat exchanger outlet pipeline 7 are automatically opened. Driven by a natural circulation driving force, the hot fluid in the heat exchanger 15 in the containment flows into the cooling water tank 9 outside the containment through the heat exchanger outlet pipeline 7 in the containment 3, and transfers the heat in the containment to the cooling water tank 9 outside the containment; the cooling water in the cooling water tank 9 outside the containment passes through the heat exchanger inlet pipeline 14 in the containment and flows back to the heat exchanger 15 in the containment again. Since the water in the cooling water tank 9 outside the containment is continuously heated (the heat in the containment and the heat transferred by the possible passive residual heat removal system), when the water in the water tank is heated to boiling, the liquid level in the water tank gradually decreases until it is emptied. Subsequently, the heat exchanger 15 and the wall surface of the containment 3 are cooled by introducing the air cooling guiding device 8 through the air channel in the containment, so as to realize the infinite-time removal of the residual heat in the core 24 and the containment 3.

For the integrated passive reactor of the present application, a reactor-type process design is adopted to reduce the loop resistance; a diversion device is provided in a fluid rising section to reduce the loop resistance; by the shrinkage of the rising section, the heat exchanger arrangement space is increased, so as to further optimize the system resistance, and designs of a passive core residual heat removal system for infinite time and a passive containment cooling system for infinite time are realized. Through properly configuring the pressure relief system and cancelling the high-pressure safety-injection, the passive core cooling system is simplified. Through a design of providing an auxiliary circulation device for loss of coolant accident, the safety of the core in the loss of coolant accident is further enhanced. The integrated passive reactor provided by the present application simplifies the configuration of the safety system, cancels the safety-level AC power source, realizes the infinite-time cooling of the reactor and the containment, and the integrated passive reactor does not require intervention from an operator during an accident, thereby improving the safety and economy of the power plant.

The above is only preferred embodiments of the present application, and is not intended to limit the present application. For those skilled in the art, the present application may have various modifications and changes. Any modification, equivalent replacement, improvement, etc. made within the spirit and principle of the present application shall be included within the protection scope of the present application.

The invention claimed is:

1. An integrated passive reactor comprising a reactor main loop, a containment cooling system, a residual heat removal system, and a core cooling system, wherein the reactor main loop comprises a pressure vessel arranged in a containment, and a core, a pressure regulator, a diversion device and a steam generator arranged in the pressure vessel, wherein the diversion device is configured in a cylindrical structure arranged above the core and has a lower end close to the core and an upper end away from the core, the lower end having a larger diameter than that of the upper end, the steam generator is configured in a coil structure wound on outside of the diversion device and has one end connected with a water supply pipeline and the other end connected with a main steam pipeline, and the pressure regulator is arranged at a top of the pressure vessel and is located above the diversion device;

the containment cooling system is configured for exchanging heat inside and outside the containment so as to reduce the temperature and pressure in the containment;

the residual heat removal system is configured for cooling a fluid in the steam generator when the water supply pipeline and the main steam pipeline are closed; and the core cooling system comprises a pressure relief pipeline arranged at a top of the pressure vessel, a pressure accumulating safety-injection tank connected with the pressure vessel, and an auxiliary circulation device, wherein the pressure relief pipeline is able to reduce the internal pressure of the pressure vessel, the pressure accumulating safety-injection tank is configured for continuously injecting cooling water into the core when the pressure in the pressure vessel is reduced to a predetermined value, and the auxiliary circulation device is arranged between the diversion device and the core and is configured for making a fluid in the pressure vessel flow between the core and the pressure vessel so as to form a circulating flow channel when a level of the fluid in the pressure vessel is lowered to a predetermined value.

2. The integrated passive reactor according to claim 1, wherein a plurality of main pumps are arranged on top of the pressure vessel, and the main pumps are configured to drive a reactor coolant fluid to exchange heat with the steam generator.

3. The integrated passive reactor according to claim 1, wherein the containment cooling system comprises a heat exchanger arranged in the containment, a cooling water tank arranged outside the containment, and an air cooling guiding device arranged in the cooling water tank, wherein an end of the air cooling guiding device extends out of the cooling water tank, and the heat exchanger is connected with the cooling water tank to transfer heat in the containment to the cooling water tank.

4. The integrated passive reactor according to claim 1, wherein the residual heat removal system comprises a heat exchanging device arranged in a cooling water tank, wherein the heat exchanging device is connected to the steam generator and is configured to cool a fluid in the steam generator when the water supply pipeline and the main steam pipeline are closed.

5. The integrated passive reactor according to claim 1, wherein the core cooling system further comprises a cooling water tank, a gravity injection pipeline and a pit recirculation pipeline, wherein the gravity injection pipeline is connected to bottom of the cooling water tank and to the pressure vessel, and the pit recirculation pipeline has one end connected to the gravity injection pipeline and the other end connected to a pit filter located in the containment.

6. The integrated passive reactor according to claim 3, wherein the containment cooling system, the residual heat removal system and the core cooling system share the same cooling water tank.

7. The integrated passive reactor according to claim 1, wherein the steam generator is configured with a first plurality of coils spiraling around their own axis and/or a second plurality of coils spiraling around the central axis of the pressure vessel, wherein the second plurality of coils is larger than the first plurality of coils.

8. The integrated passive reactor according to claim 1, wherein the auxiliary circulation device is configured as a signal-driven valve, a differential-pressure-driven valve, a differential-pressure-driven baffle, a signal-driven lock baffle or a spring lock one-way flow device or a spring float one-way flow device.

9. The integrated passive reactor according to claim 4, wherein the containment cooling system comprising a heat exchanger arranged in the containment, an upper end of the heat exchanger is connected with a heat exchanger outlet pipeline, the heat exchanger outlet pipeline being connected to an upper part of the cooling water tank and being provided with a heat exchanger outlet pipeline isolation valve, and a lower end of the heat exchanger is connected with a heat exchanger inlet pipeline, the heat exchanger inlet pipeline being connected to a lower part of the cooling water tank, the heat exchanging device is connected to the steam generator through a heat exchanging device inlet pipeline and a heat exchanging device outlet pipeline, the heat exchanging device outlet pipeline being provided with a heat exchanging device outlet pipeline isolation valve, and the heat exchanger outlet pipeline isolation valve and the heat exchanging device outlet pipeline isolation valve are normally closed steam-operated valves, the steam-operated valves being automatically opened when a safety level fails.

10. The integrated passive reactor according to claim 5, wherein the pressure relief pipeline is provided with a pressure relief valve, the pit recirculation pipeline is provided with a recirculation valve, and the pressure relief valve and the recirculation valve are configured as safety level DC-driven burst valves.

* * * * *